(12) United States Patent
Maleki

(10) Patent No.: US 11,079,480 B2
(45) Date of Patent: Aug. 3, 2021

(54) FMCW LIDAR WITH WAVELENGTH DIVERSITY

(71) Applicant: GM Cruise Holdings LLC, San Francisco, CA (US)

(72) Inventor: Lutfollah Maleki, Pasadena, CA (US)

(73) Assignee: GM CRUISE HOLDINGS LLC, San Francisco, CA (US)

(*) Notice: Subject to any disclaimer, the term of this patent is extended or adjusted under 35 U.S.C. 154(b) by 341 days.

(21) Appl. No.: 16/236,484

(22) Filed: Dec. 29, 2018

(65) Prior Publication Data

US 2020/0209366 A1 Jul. 2, 2020

(51) Int. Cl.
*G01S 3/08* (2006.01)
*G01S 7/4911* (2020.01)
*G01S 17/34* (2020.01)

(52) U.S. Cl.
CPC ............. *G01S 7/4911* (2013.01); *G01S 17/34* (2020.01)

(58) Field of Classification Search
CPC .......... G01S 17/34; G01S 17/26; G01S 17/58; G01S 7/4911; G01S 7/4815; G02F 2203/54
USPC ........................................ 356/5.01
See application file for complete search history.

(56) References Cited

U.S. PATENT DOCUMENTS

| 5,892,575 A | 4/1999 | Marino |
| 6,654,401 B2 | 11/2003 | Cavalheiro Vieira et al. |
| 7,511,824 B2 | 3/2009 | Sebastian et al. |
| 8,471,895 B2 | 6/2013 | Banks |
| 9,735,885 B1 * | 8/2017 | Sayyah .................. H01P 7/082 |
| 9,851,433 B2 | 12/2017 | Sebastian et al. |
| 10,224,688 B2 * | 3/2019 | Koptyaev ............... H01S 5/005 |
| 2010/0271614 A1 | 10/2010 | Albuquerque et al. |

(Continued)

FOREIGN PATENT DOCUMENTS

| CN | 102769251 A | | 11/2012 | |
| JP | 2015053210 | * | 4/2015 | ......... G01B 9/02003 |
| JP | 2019045200 A | * | 4/2019 | ............ G01S 17/32 |

OTHER PUBLICATIONS

"International Search Report for PCT Patent Application No. PCT/US2019/063892", dated Mar. 20, 2020, 4 Pages.

(Continued)

*Primary Examiner* — Mark Hellner
(74) *Attorney, Agent, or Firm* — Medley, Behrens & Lewis, LLC

(57) ABSTRACT

Various technologies described herein pertain to multiple laser, single optical resonator lidar systems. A lidar system includes a single optical resonator optically coupled to at least a first laser and a second laser. The optical resonator is formed of an electrooptic material. The first laser and the second laser are optically injection locked to the optical resonator. Moreover, a modulator applies a time-varying voltage to the optical resonator to control modulation of an optical property of the electrooptic material, which causes the first laser to generate a first frequency modulated optical signal comprising a first series of optical chirps and/or the second laser to generate a second frequency modulated optical signal comprising a second series of optical chirps. Further, front end optics transmits at least a portion of the first frequency modulated optical signal and/or the second frequency modulated optical signal into an environment from the lidar system.

20 Claims, 12 Drawing Sheets

(56) References Cited

U.S. PATENT DOCUMENTS

| | | |
|---|---|---|
| 2013/0003766 A1 | 1/2013 | Savchenkov et al. |
| 2016/0377721 A1 | 12/2016 | Lardin et al. |
| 2019/0025431 A1 | 1/2019 | Satyan et al. |
| 2019/0146091 A1* | 5/2019 | Matsko ................ G01S 7/4808 356/5.01 |
| 2020/0011994 A1* | 1/2020 | Thorpe .................. G01S 17/34 |

OTHER PUBLICATIONS

"Written Opinion of the International Searching Authority for PCT Patent Application No. PCT/US2019/063892", dated Mar. 20, 2020, 8 Pages.

\* cited by examiner

FMCW LIDAR WITH WAVELENGTH DIVERSITY

BACKGROUND

Light detection and ranging (lidar) systems are surveying systems that measure distance to a target in an environment by illuminating the target with laser light and measuring reflected light (lidar return). Differences in laser return times can be utilized to generate a three-dimensional (3D) representation of the target. Lidar systems can also be used to measure the velocity of the target with respect to the observer. Thus, lidar systems can be used in various terrestrial, airborne, and mobile applications; for instance, lidar systems can be employed in autonomous or semi-autonomous vehicles, drones, robotics and other applications that utilize laser scanning capabilities.

One type of lidar system is a direct time of flight (TOF) lidar system. A direct TOF lidar system emits an optical signal that includes short pulses of light, such that the pulses of light can reflect off a target in an environment (assuming a target is in a position in the environment towards which the pulses of light are directed). The direct TOF lidar system can receive reflected pulses (e.g., the pulses of light that reflect off the target, if any). A delay between transmission and reception can be utilized to determine the distance between the direct TOF lidar system and the target. The direct TOF lidar system may also determine a speed of the target by comparing two frames of data; assuming that the target is identified in two frames captured at different times, a change in the position of the target over time can be utilized to determine the speed of the target.

Another type of lidar system is a frequency modulated continuous wavelength (FMCW) lidar system. A FMCW lidar system can include a laser source that generates a frequency modulated optical signal that includes a continuous series of optical chirps, where the frequency within each chirp varies with time. The FMCW lidar system can transmit the optical chirps across an environment. Moreover, a receiver of the FMCW lidar system can receive reflected optical signals (e.g., the optical chirps that reflect off a target located in the environment, if any). Measurement of a frequency shift and/or a phase shift for each reflected optical chirp relative to a reference optical chirp can provide a measure of a distance and/or a speed of the target relative to the FMCW lidar system.

In many lidar systems, such as, for example, a lidar system used in an autonomous vehicle, the optical signal is scanned in space to encompass a desired field of view. Various scanning mechanisms such as rotating mirrors or rotating lasers, for example, may be used to scan the optical signal of the lidar system.

It is oftentimes desirable to increase the signal-to-noise ratio (SNR) of a lidar system. SNR of a lidar system can be increased by increasing a power level of a signal received by the lidar system, decreasing noise received by the lidar system, or a combination thereof. For instance, performance of a lidar system can be limited by the power level of the signal detected by the lidar system and/or the noise received by the lidar system. Moreover, the SNR of a lidar system can be particularly degraded as a range of the lidar system is increased or when operating in various weather conditions (e.g., rain, snow, fog). For instance, absorption and scattering from atmospheric particles such as rain, snow, and fog can cause signal degradation (e.g., reduced SNR). Further, the noise received by the lidar system commonly includes speckle, which is associated with coherence of a laser. Speckle is a fine scale, high contrast, granular pattern that appears when an optical signal is reflected from a surface with roughness on the same scale as a wavelength of the optical signal from a laser of a lidar system (or larger). The speckle pattern produces noisy intensity fluctuations that are detrimental to the SNR of conventional lidar systems.

SUMMARY

The following is a brief summary of subject matter that is described in greater detail herein. This summary is not intended to be limiting as to the scope of the claims.

Described herein are various technologies that pertain to multiple laser, single optical resonator lidar systems. A lidar system includes multiple lasers and a single optical resonator, where the multiple lasers are each optically coupled to the optical resonator. Thus, the lidar system includes at least a first laser and a second laser, where the optical resonator is optically coupled to both the first laser and the second laser. The optical resonator is formed of an electrooptic material. Moreover, the first laser and the second laser are optically injection locked to the optical resonator. The lidar system further includes a modulator configured to apply a time-varying voltage to the optical resonator. The time-varying voltage can control modulation of an optical property of the electrooptic material (e.g., index of refraction) to cause the first laser to generate a first frequency modulated optical signal comprising a first series of optical chirps and/or the second laser to generate a second frequency modulated optical signal comprising a second series of optical chirps. Moreover, the lidar system can include front end optics configured to transmit at least a portion of the first frequency modulated optical signal and/or the second frequency modulated optical signal into an environment from the lidar system.

The lidar system can further include a beam splitter configured to split the frequency modulated optical signal(s) into the portion of the frequency modulated optical signal(s) to be transmitted into the environment and a local oscillator portion of the frequency modulated optical signal(s). The lidar system can also include a sensor and processing circuitry. According to an example, the front end optics of the lidar system can be configured to receive a reflected optical signal, wherein the reflected optical signal corresponds to at least a part of the portion of the frequency modulated optical signal(s) transmitted from the lidar system that reflected off an object in the environment. The sensor can be configured to mix the reflected optical signal with the local oscillator portion of the frequency modulated optical signal(s). Further, the processing circuit circuitry can be configured to compute distance and velocity data of the object based on the output of the sensor.

According to various embodiments, the first laser and the second laser can concurrently operate. Thus, when the modulator applies the time-varying voltage to the optical resonator, the time-varying voltage can control modulation of the optical property of the electrooptic material to cause the first laser to generate the first frequency modulated optical signal comprising the first series of optical chirps and the second laser to generate the second frequency modulated optical signal comprising the second series of optical chirps. Since the first laser and the second laser are optically injection locked to the same optical resonator, the time-varying voltage applied to the optical resonator can impart a common frequency change on both the first laser and the second laser for optical chirps concurrently generated by the first laser and the second laser. In such embodiments, the lidar system can include a beam combiner configured to combine the first frequency modulated optical signal and the second frequency modulated optical signal to form a combined frequency modulated optical signal. Thus, the front end optics can be configured to transmit at least a portion of the combined frequency modulated optical signal into the environment from the lidar system (e.g., a local oscillator portion of the combined frequency modulated optical signal can be provided to the sensor to be mixed with the reflected optical signal received by the front end optics).

Continued reference is made to embodiments in which the first laser and the second laser concurrently operate. The first laser can operate at a first wavelength and the second laser can operate as a second wavelength. According to an example, the first wavelength and the second wavelength can be the same. Following this example, use of two (or more) lasers that are concurrently operating at a common wavelength can enable increasing a power of the lidar system (as compared to use of a single laser). Pursuant to another example, the first wavelength can differ from the second wavelength. The difference in the wavelengths of the lasers that are concurrently operating can allow for reducing noise from speckle. The noise due to speckle can be reduced because of a diminished correlation generated by the wavelength differences.

According to other embodiments, the first laser and/or the second laser can be selectively enabled or disabled. By way of illustration, during a given time period, the first laser can be enabled and the second laser can be disabled. Following this illustration, during a differing time period, the first laser can be disabled and the second laser can be enabled. The lidar system can include a controller configured to selectively control operating states of the first laser and the second laser such that either the first laser is enabled and the second laser is disabled or the first laser is disabled in the second laser is enabled during a particular period of time. Similar to above, the modulator can be configured to apply the time-varying voltage to the optical resonator. The time-varying voltage controls modulation of the optical property of the electrooptic material to cause either the first laser to generate the first frequency modulated optical signal when the first laser is enabled or the second laser to generate the second frequency modulated optical signal when the second laser is enabled. Moreover, the front end optics can be configured to transmit, into the environment from the lidar system, at least a portion of the first frequency modulated optical signal when the first laser is enabled or at least a portion of the second frequency modulated optical signal when the second laser is enabled.

Selectively enabling and disabling the first laser and the second laser can allow for changing an operating wavelength of the lidar system. More particularly, the first laser can be configured to operate at a first wavelength and the second laser can be configured to operate at a second wavelength, where the second wavelength differs from the first wavelength. According to an illustration, the first wavelength can be one of 905 nm, 1550 nm, or 3 µm, and the second wavelength can be a differing one of 905 nm, 1550 nm or 3 µm; yet, it is contemplated that other wavelengths are intended to fall within the scope of the hereto appended claims. Pursuant to an example, the controller can be configured to selectively control the operating states of the first laser and the second laser based on a desired detection range of the lidar system. According to another example, the controller can be configured to selectively control the operating states of the first laser and the second laser based on a moisture level in the environment.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
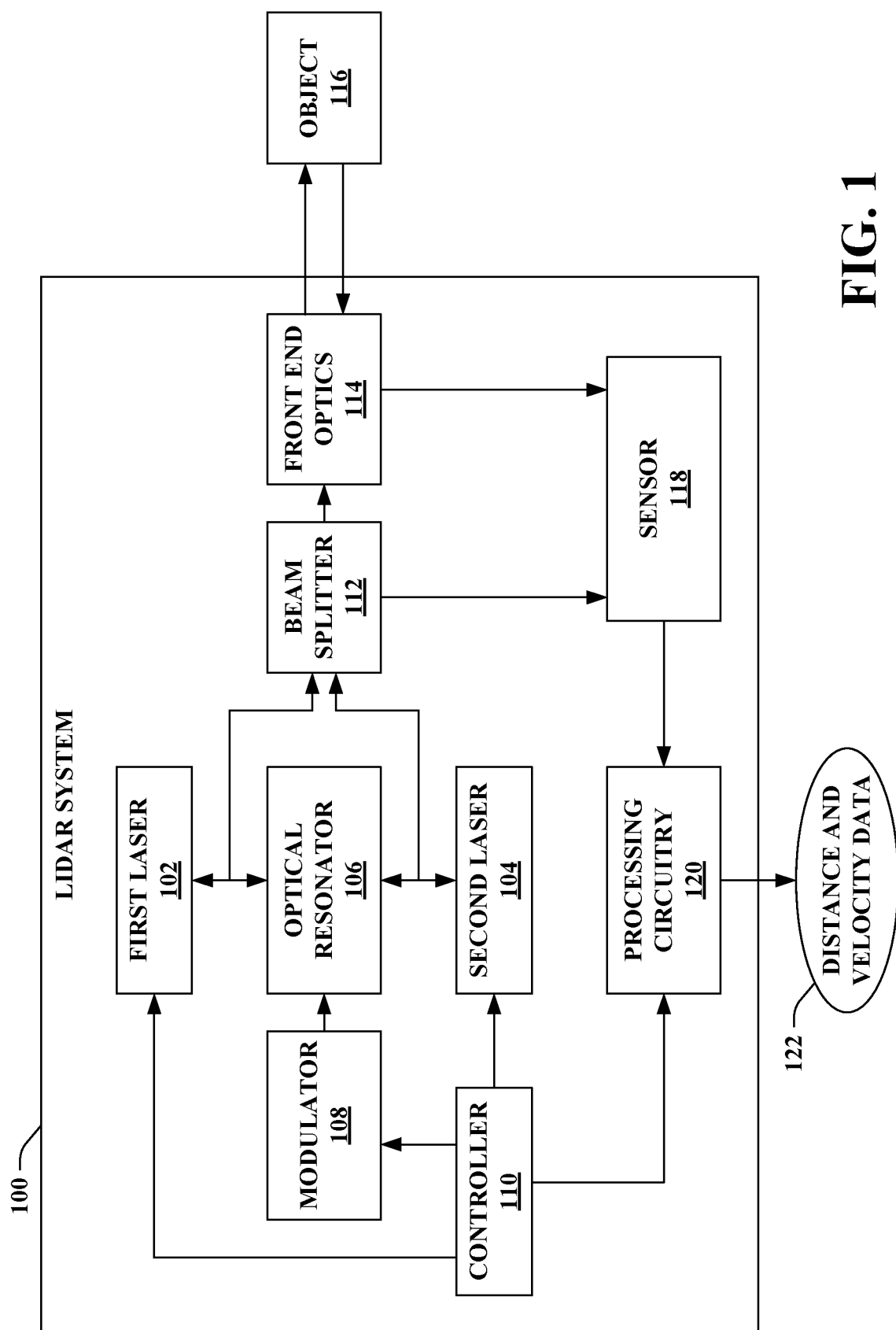
FIG. 1 illustrates a functional block diagram of an exemplary multiple laser, single optical resonator lidar system.

Various technologies pertaining to multiple laser, single optical resonator lidar are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

Referring now to the drawings, FIG. 1 illustrates an exemplary multiple laser, single optical resonator lidar system 100. The lidar system 100 is an FMCW lidar system. The lidar system 100 includes two lasers, namely, a first laser 102 and a second laser 104 (collectively referred to herein as lasers 102-104). The lasers 102-104 can be semiconductor lasers, laser diodes, or the like. While many of the examples set forth herein describe lidar systems that include two lasers (e.g., the lasers 102-104), it is to be appreciated that these examples can be extended to lidar systems that include more than two lasers.

The first laser 102 operates at a first wavelength and the second laser 104 operates at a second wavelength. In various embodiments described herein, the first wavelength and the second wavelength can be the same (e.g., the first laser 102 and the second laser 104 can operate at a common wavelength). In other embodiments described herein, the first wavelength can differ from the second wavelength (e.g., the first laser 102 and the second laser 104 can operate at different wavelengths). Various wavelength differences are intended to fall within the scope of the hereto appended claims. For instance, the difference between the wavelengths can be on the order of 10s of nm; such wavelength diversity can mitigate contribution from speckle noise by decorrelating the speckle field (e.g., the first laser 102 and the second laser 104 are concurrently operating). According to another illustration, larger differences between the wavelengths can fall within the scope of the hereto appended claims (e.g., when switching between the lasers 102-104 depending on characteristics of the wavelengths such as eye safety, range, and performance in various environmental conditions).

The lidar system 100 further includes an optical resonator 106. The optical resonator 106 can be a whispering gallery mode (WGM) resonator (e.g., a high Q WGM resonator). The optical resonator 106 is optically coupled to both the first laser 102 and the second laser 104. Moreover, the optical resonator 106 is formed of an electrooptic material. Examples of the electrooptic material include lithium niobite, lithium tantalate, and so forth.

The optical resonator 106 can include an electrode (or electrodes) to which a voltage can be applied. Application of a voltage to the optical resonator 106 can change an optical property of the electrooptic material of the optical resonator 106. For instance, application of a voltage can change an index of refraction of the electrooptic material of the optical resonator 106.

The first laser 102 and the second laser 104 are optically injection locked to the optical resonator 106. The lasers 102-104 are each injection locked to a mode of the optical resonator 106. By selecting the modes to be of the same family (e.g., transverse electric (TE) or transverse magnetic (TM)), optical signals outputted by the lasers 102-104 can have common (low) noise characteristics. Moreover, since the lasers 102-104 are optically injection locked to the optical resonator 106, a voltage applied to the optical resonator 106 can impart a common frequency change on both of the lasers 102-104.

The lidar system 100 can include a modulator 108 configured to apply a time-varying voltage to the optical resonator 106. The time-varying voltage can control modulation of an optical property of the electrooptic material (e.g., the index of refraction) of the optical resonator 106 to cause the first laser 102 to generate a first frequency modulated optical signal comprising a first series of optical chirps and/or the second laser 104 to generate a second frequency modulated optical signal comprising a second series of optical chirps.

According to various embodiments, the first laser 102 and the second laser 104 can concurrently operate. In such embodiments, when the modulator 108 applies the time-varying voltage to the optical resonator 106, the time-varying voltage can control modulation of the optical property of the electrooptic material to cause the first laser 102 to generate the first frequency modulated signal and the second laser 104 to generate the second frequency modulated optical signal. As noted above, since the first laser 102 and the second laser 104 are optically injection locked to the same optical resonator 106, the time-varying voltage applied to the optical resonator 106 by the modulator 108 can impart a common frequency change on both the first laser 102 and the second laser 104 for optical chirps concurrently generated by the first laser 102 and the second laser 104.

In other embodiments, the first laser 102 and the second laser 104 can be selectively enabled or disabled. Pursuant to an illustration, the first laser 102 can be enabled during a first time period and the second laser 104 can be disabled during the first time period. Following this illustration, the first laser 102 can be disabled during a second time period and the second laser 104 can be enabled during the second time period. According to another illustration, both of the lasers 102-104 can be enabled during a given time period, while the first laser 102 can be enabled and the second laser 104 can be disabled during a differing time period. Moreover, it is contemplated that a combination of the foregoing can be implemented.

The lidar system 100 further includes a controller 110 operatively coupled with the lasers 102-104 and the modulator 108. The controller 110, for instance, can control the modulator 108 to apply the time-varying voltage to the optical resonator 106. The controller 110 can control timing, waveform shape, or the like of the time-varying voltage. By way of example, the controller 110 can control the modulator 108 to apply a continuous wave sawtooth waveform, a continuous wave triangular waveform, a pulsed triangular waveform, a continuous wave sigmoid-shaped waveform, or the like. Further, the controller 110 can change the waveform shape (or properties of a particular waveform shape) over time. Moreover, in various embodiments, the controller 110 can be configured to selectively control operating states of the first laser 102 and the second laser 104.

The lidar system 100 can further include a beam splitter 112 configured to split the frequency modulated optical signal(s) generated by the first laser 102 and/or the second laser 104 into a portion of the frequency modulated optical signal(s) to be transmitted into an environment from the lidar system 100 and a local oscillator portion of the frequency modulated optical signal(s).

Moreover, the lidar system 100 can include front end optics 114 configured to transmit, into the environment from the lidar system 100, at least a portion of the frequency modulated optical signal(s) (e.g., the portion to be transmitted outputted by the beam splitter 112). According to various examples, the front end optics 114 can include a scanner. The scanner can direct the optical signal(s) over a field of view in the environment. According to various examples, the scanner can include a two-dimensional (2D) micro-electro-mechanical systems (MEMS) mirror. Pursuant to another example, the scanner can include a non-MEMS reflecting 2D analog scanner, such as a mirror galvanometer; however, the claimed subject matter is not so limited.

It is contemplated that the controller 110 can control positioning of the scanner to cause the scanner to direct the optical signal(s) into the environment according to a scan pattern. In accordance with an example, the scan pattern can be a raster scan pattern. However, it is to be appreciated that the controller 110 can alternatively cause the scanner to direct the optical signal(s) into the environment using other scan patterns, such as Lissajous or non-regular forms.

While not shown, it is to be appreciated that the lidar system 100 can further include various other optical elements, such as one or more lenses, an optical isolator, one or more waveguides, an optical amplifier, an interferometer, and so forth. Such optical elements can enable generating the optical signal(s) with desired properties such as collimation, divergence angle, linewidth, power, and the like. Such optical elements may be assembled discretely, or integrated on a chip, or in a combination of both.

Moreover, the front end optics 114 can be configured to receive a reflected optical signal. The reflected optical signal can correspond to at least a part of the portion of the frequency modulated optical signal(s) transmitted into the environment that reflected off an object 116 in the environment. According to an example where the front end optics 114 include the scanner as noted above, it is contemplated that the scanner can be configured to receive the reflected optical signal.

The lidar system 100 can further include a sensor 118 and processing circuitry 120. The sensor 118 can be configured to mix the reflected optical signal received by the front end optics 114 with the local oscillator portion of the frequency modulated optical signal(s). The sensor 118, for instance, can be a photodetector. The processing circuitry 120 can be configured to compute distance and velocity data 122 of the object 116 based on the output of the sensor 118. The distance and velocity data 122 can include distance data between the lidar system 100 and the object 116 and/or velocity data. Thus, the distance data can include a measure of a distance between the lidar system 100 and the object 116. Moreover, the velocity data can include a measure of a velocity of the object 116 relative to the lidar system 100. It is contemplated that the processing circuitry 120 can be controlled by the controller 110. Moreover, although not shown, it is completed that the lidar system 100 can include various other elements (e.g., an analog to digital converter (ADC), etc.); thus, the sensor 118 and the processing circuitry 120 (as well as other elements of a receiver of the lidar system 100) can enable measuring a frequency shift and/or a phase shift for each reflected optical chirp relative to a reference optical chirp (in the local oscillator portion of the frequency modulated optical signal(s)) to enable generating the distance and velocity data 122.

Various embodiments in which the first laser 102 and/or the second laser 104 of the lidar system 100 are selectively enabled or disabled are now described. As noted above, the first laser 102 operates at the first wavelength and the second laser 104 operates at the second wavelength. In some examples where the first laser 102 and the second laser 104 are selectively enabled or disabled, the first wavelength can differ from the second wavelength. Thus, the lidar system 100 (e.g., the controller 110) can switch between the lasers 102-104 depending on characteristics of the wavelengths such as eye safety, range, and performance in various environmental conditions. Pursuant to an illustration, the first wavelength can be one of 905 nm, 1550 nm, or 3 μm, and the second wavelength can be a different one of 905 nm, 1550 nm, or 3 μm. However, it is to be appreciated that other wavelengths are intended to fall within the scope of the hereto appended claims. Moreover, it is also contemplated that the first wavelength and the second wavelength can be the same in other examples where the first laser 102 and the second laser 104 are selectively enabled or disabled. For instance, concurrent operation of the two lasers 102-104 at a common wavelength can enable increasing a power of the lidar system 100 (as compared to use of a single laser). Thus, the power of the lidar system 100 can be adjusted by the controller 110 selectively controlling a number of the lasers 102-104 that are concurrently enabled during a given time period.

Figure 2:
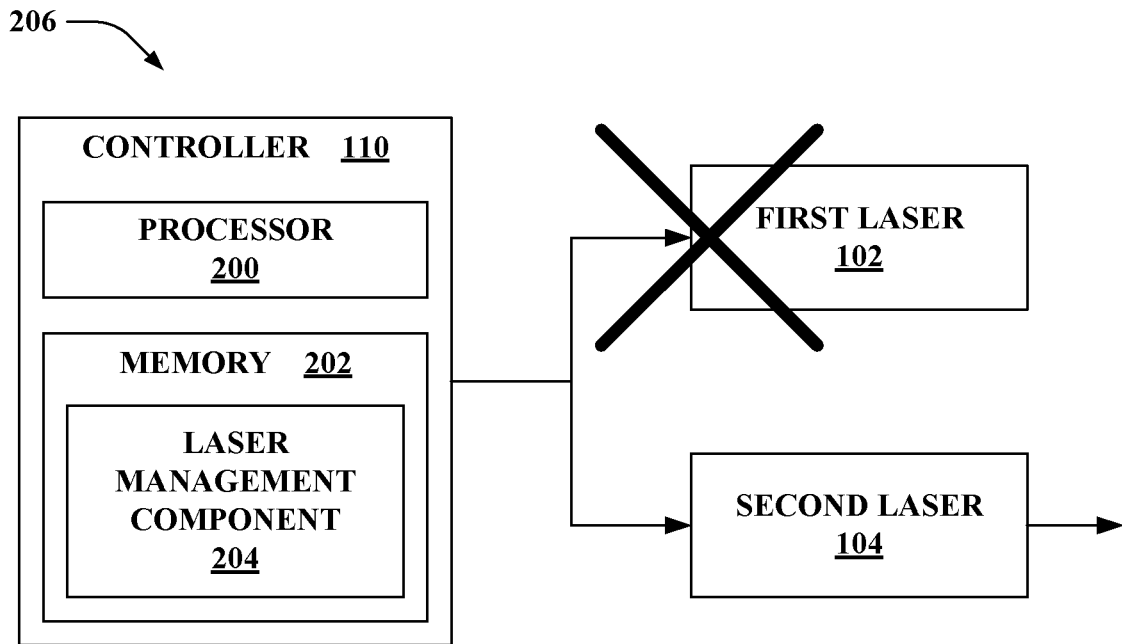
FIG. 2 illustrates a functional block diagram of an example in which a controller selectively enables a first laser and/or a second laser of a lidar system during differing time periods.
Figure 2:
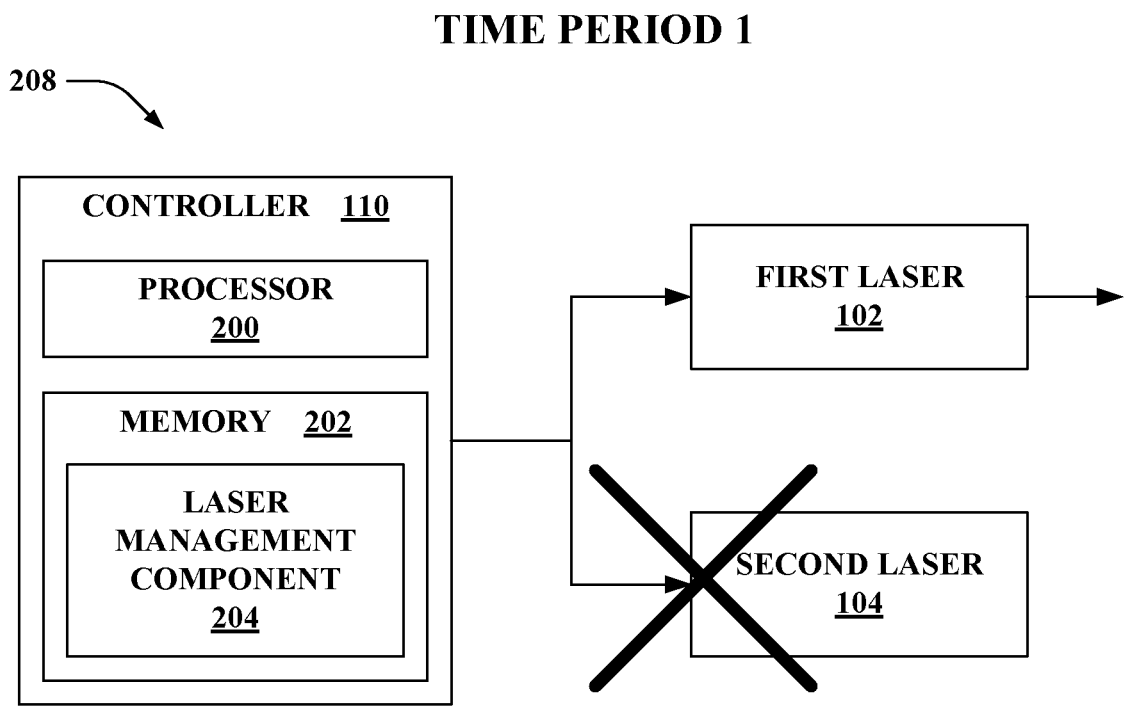

Turning to FIG. 2, illustrated is an example in which the controller 110 selectively enables the first laser 102 and/or the second laser 104 during differing time periods. The example depicted in FIG. 2 pertains to a scenario in which the first wavelength differs from the second wavelength. Thus, the controller 110 can switch between the lasers 102-104 depending on characteristics of the wavelengths.

The controller 110 can include a processor 200 and memory 202. The memory 202 includes computer-executable instructions that are executed by the processor 200. The memory 202 can include a laser management component 204 configured to selectively control operating states of the first laser 102 and the second laser 104. For instance, the laser management component 204 can control the operating states of the first laser 102 and the second laser 104 such that either 1) the first laser 102 is enabled and the second laser 104 is disabled, or 2) the first laser 102 is disabled and the second laser 104 is enabled. For instance, during time period 1 shown in FIG. 2 at 206, the laser management component 204 can control the operating states of the first laser 102 and the second laser 104 such that the first laser 102 is disabled and the second laser 104 is enabled. Further, during time period 2 shown in FIG. 2 at 208, the laser management component 204 can control the operating states of the first laser 102 and the second laser 104 such that the first laser 102 is enabled and the second laser 104 is disabled.

Reference is again made to FIG. 1. As described above, the controller 110 (e.g., the laser management component 204) can selectively control the operating states of the first laser 102 and the second laser 104 such that either the first laser 102 is enabled and the second laser 104 is disabled or the first laser 102 is disabled and the second laser 104 is enabled. Further, following this example, the modulator 108 can apply the time-varying voltage to the optical resonator 106, where the time-varying voltage controls modulation of the optical property of the electrooptic material to cause either the first laser 102 to generate the first frequency modulated optical signal including the first series of optical chirps when the first laser 102 is enabled (and the second laser 104 is disabled) or the second laser 104 to generate the second frequency modulated optical signal including the second series of optical chirps when the second laser 104 is enabled (and the first laser 102 is disabled). Further, the front end optics 114 can transmit a portion of either the first frequency modulated optical signal (when the first laser 102 is enabled and the second laser 104 is disabled) or at least a portion of the second frequency modulated optical signal (when the second laser 104 is enabled and the first laser 102 is disabled). As noted above, the beam splitter 112 can split either the first frequency modulated optical signal or the second frequency optical frequency modulated optical signal into the portion to be transmitted into the environment and the local oscillator portion (e.g., which is provided to the sensor 118 and mixed with the reflected optical signal).

Figure 3:
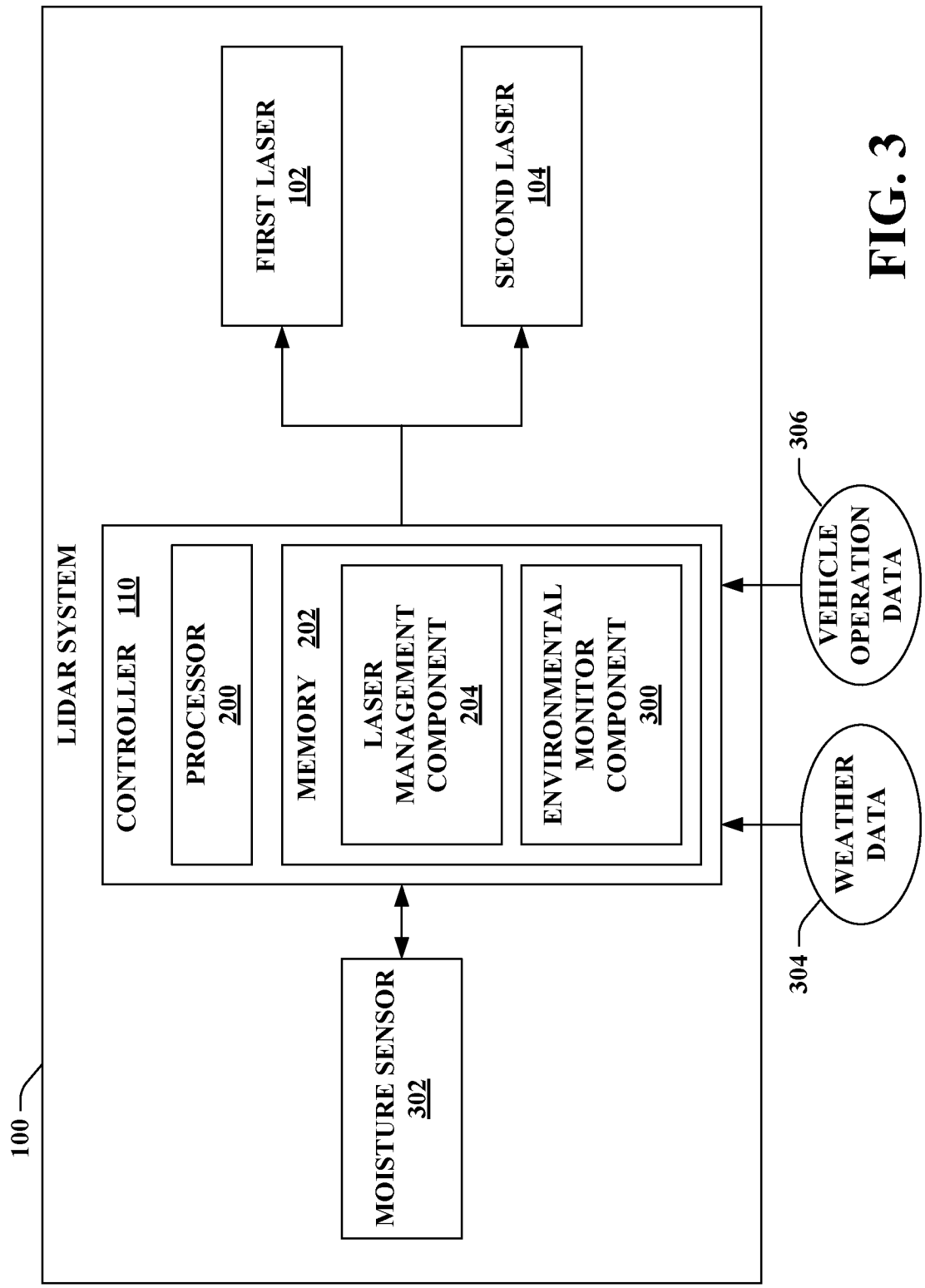
FIG. 3 illustrates a functional block diagram of another example in which the controller selectively enables the first laser and/or the second laser of the lidar system.

Referring now to FIG. 3, illustrated is another example in which the controller 110 selectively enables the first laser 102 and/or the second laser 104 of the lidar system 100. It is to be appreciated that FIG. 3 only depicts some of the elements of the lidar system 100. In the example set forth in FIG. 3, the laser management component 204 of the controller 110 can control the operating states of the first laser 102 and the second laser 104 based on various factors. According to an example, the laser management component 204 can selectively control the operating states of the first laser 102 and the second laser 104 based on a desired detection range of the lidar system 100. Pursuant to an illustration, the first laser 102 can operate at 1550 nm and the second laser 104 can operate at 905 nm. Following this illustration, when the desired detection range of the lidar system 100 is greater than a threshold distance, the laser management component 204 can selectively enable the first laser 102 and disable the second laser 104 (e.g., 1550 nm can be more eye safe than 905 nm at higher power levels used for detecting object(s) at farther distances).

Additionally or alternatively, the controller 110 (e.g., the laser management component 204) can be configured to selectively control the operating states of the first laser 102 and the second laser 104 based on a moisture level in the environment. The memory 202 can include an environmental monitor component 300 that can identify the moisture level in the environment. According to an example, the lidar system 100 can include a moisture sensor 302 configured to detect the moisture level in the environment; following this example, the moisture sensor 302 can send detected moisture level data to the environmental monitor component 300 (e.g., the environmental monitor component 300 can determine whether the moisture level exceeds a threshold moisture level). According to another example, the environmental monitor component 300 can be configured to receive weather data 304 indicative of the moisture level in the environment. For instance, the weather data 304 can specify that it is currently snowing or raining; thus, the moisture level can be identified by the environment monitor component 300 based on the weather data 304. Pursuant to yet another example, the environmental monitor component 300 can receive vehicle operation data 306, which can be utilized to identify the moisture level in the environment. For instance, the vehicle operation data 306 can specify windshield wiper operation of a vehicle in which the lidar system 100 is utilized (e.g., an assumption can be made that it is raining or snowing when the windshield wipers are on as specified in the vehicle operation data 306). Thus, the controller 110 can be configured to selectively control the operating states of the first laser 102 and the second laser 104 based on windshield wiper operation.

By way of illustration, the first laser 102 can be configured to operate at a wavelength of 1550 nm and the second laser 104 can be configured to operate at either 905 nm or 3 µm. Following this illustration, the environmental monitor component 300 can determine whether the moisture level in the environment exceeds the threshold moisture level. The laser management component 204 can be configured to selectively control the operating states of the first laser 102 and the second laser 104 such that the first laser 102 is enabled and the second laser 104 is disabled when the moisture level in the environment is below a threshold moisture level (e.g., the first laser 102 operating at 1550 nm is utilized when the moisture level in the environment is below the threshold moisture level). Further, the laser management component 204 can be configured to selectively control the operating states of the first laser 102 and the second laser 104 such that the first laser 102 is disabled and the second laser 104 is enabled when the moisture level in the environment is equal to or above the threshold moisture level (e.g., the second laser 104 operating at either 905 nm or 3 µm is enabled when the moisture level in the environment is equal to or above the threshold moisture level).

Wavelength diversity can be employed to manage weather effects on the lidar system 100. Since certain wavelengths, such as 1550 nm, are absorbed by water, such wavelengths may not perform as well for generating a return signal in rain, snow, or fog as compared to other wavelengths (e.g., 905 nm or 3 µm). However, 905 nm may be less desirable due to eye safety. Accordingly, the lidar system 100 can support operation at two wavelengths, where the 1550 nm laser can be used in dry weather while other wavelengths (e.g., 905 nm or 3 µm) can be utilized in wet weather. Moreover, the presence of moisture can reduce the intensity and therefore enable the 905 nm laser to operate at an eye safe level. Thus, for instance, 1550 nm wavelength can be more eye safe while shorter wavelengths can produce better SNR in snow, fog and rain.

It is to be appreciated that the coupling of the first laser 102 and the second laser 104 to the optical resonator 106 can be possible for substantially any two wavelengths that fall within the transparency window of the resonator material of the optical resonator 106. Moreover, it is noted that if the two wavelengths are far apart, optics that are transparent to both wavelengths can be utilized. Further, it is contemplated that the use of coating to produce dichroism for optical element(s) of the lidar system 100 can be utilized.

Various embodiments in which the first laser 102 and the second laser 104 concurrently operate are now described. As noted above, the first laser 102 operates at the first wavelength and the second laser 104 operates at the second wavelength. In many of the examples set forth below, the first wavelength can differ from the second wavelength (e.g., the first laser 102 and the second laser 104 can operate at different wavelengths). Various wavelength differences for the concurrently operating lasers 102-104 are intended to fall within the scope of the hereto appended claims. For instance, the difference between the wavelengths can be on the order of 10s of nm; such wavelength diversity can mitigate contribution from speckle noise by decorrelating the speckle field. However, it is also contemplated that the following examples can be extended to a scenario in which the concurrently operating lasers 102-104 each operate at a common wavelength (though such scenario would not be used to mitigate speckle noise).

Figure 4:
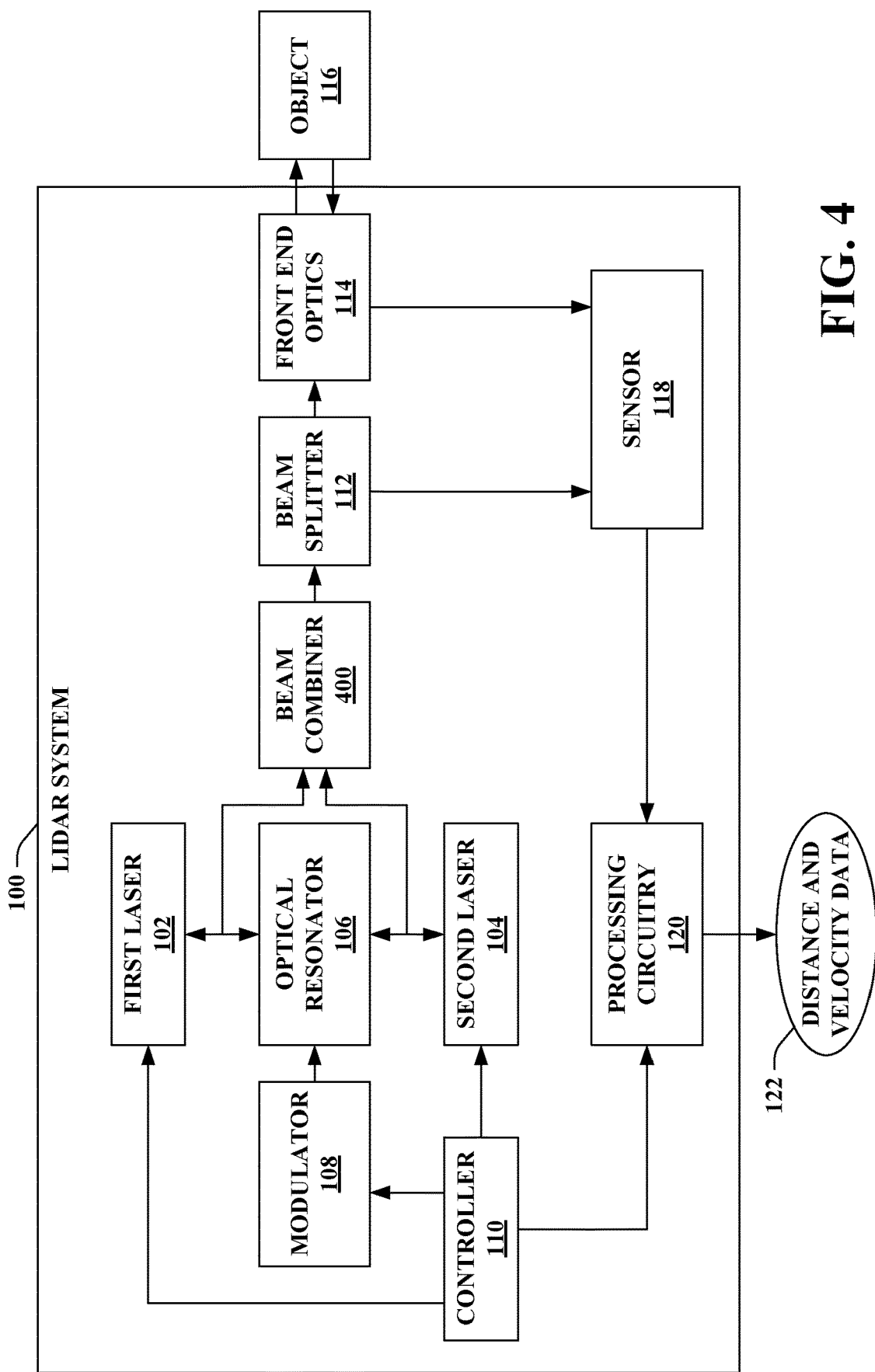
FIG. 4 illustrates a functional block diagram of another exemplary multiple laser, single optical resonator lidar system.

Now turning to FIG. 4, illustrated is another exemplary embodiment of the lidar system 100. As depicted in FIG. 4, the lidar system 100 can further include a beam combiner 400. In the example shown in FIG. 4, the first laser 102 and the second laser 104 concurrently operate. The first laser 102 and the second laser 104 are self-injection locked to the same optical resonator 106, which can enable achieving the same high coherence. Moreover, common frequency chirps can be generated by the first laser 102 and the second laser 104 during a given time period.

The modulator 108 can apply the time-varying voltage to the optical resonator 106, where the time-varying voltage controls modulation of the optical property of the electrooptic material to cause the first laser 102 to generate the first frequency modulated optical signal comprising the first series of optical chirps and the second laser 104 to generate the second frequency modulated optical signal comprising the second series of optical chirps. Further, the beam combiner 400 can be configured to combine of the first frequency modulated optical signal and the second frequency modulated optical signal to form a combined frequency modulated optical signal. The beam splitter 112 can split the combined frequency modulated optical signal into the portion of the combined frequency modulated optical signal to be transmitted into the environment (e.g., by the front end optics 114) and a local oscillator portion of the combined frequency modulated optical signal provided to the sensor 118.

The front end optics 114 can be configured to receive the reflected optical signal, which corresponds to at least a part of the portion of the combined frequency modulated optical signal that reflected off the object 116 in the environment. Moreover, the sensor 118 can mix the reflected optical signal with the local oscillator portion of the combined frequency modulated optical signal. The processing circuitry 120 can further compute the distance and velocity data 122 based on the reflected optical signal mixed with the local oscillator portion of the combined frequency modulated optical signal (e.g., the distance between the lidar system 100 and the object 116 and/or the velocity of the object 116 relative to the lidar system 100).

According to an example, it is to be appreciated that the controller 110 can be configured to selectively control whether the first laser 102 is enabled or disabled and whether the second laser 104 is enabled or disabled as described above. Thus, the first laser 102 can generate the first frequency modulated optical signal when enabled (e.g., the first frequency modulated optical signal is not generated when the first laser 102 is disabled). Likewise, the second laser 104 can generate the second frequency modulated optical signal when enabled (e.g., the second laser 104 does not generate the second frequency modulated optical signal when disabled). When both lasers 102-104 are concurrently enabled by the controller 110, the beam combiner 400 can combine the first frequency modulated optical signal and the second frequency modulated optical signal. However, it is contemplated that the claimed subject matter is not limited to this example.

As noted above, the first wavelength of the first laser 102 can differ from the second wavelength of the second laser 104. In accordance with an example, the lidar system 100 can include two lasers 102-104 separated by a wavelength of about 30 nm. According to an example, the first wavelength and second wavelength to be separated by more than 20 nm and less than 40 nm. According to yet another example, the first wavelength and the second wavelength can be separated by more than 25 nm and less than 35 nm. Pursuant to another example, the first wavelength can be 1530 nm and the second wavelength can be 1560 nm. However, is to be appreciated claimed subject matter is not limited to the foregoing examples.

The lasers 102-104 can be coupled to a common frequency chirping system, namely, the optical resonator 106 and the modulator 108. Both lasers 102-104 can be utilized to illuminate the object 116 (e.g., a target in the environment), and the reflected optical signal (including chirps from both lasers 102-104) from the target can be introduced into a common detector assembly (e.g., the sensor 118). The sensor 118 can mix the reflected optical signal with the local oscillator signals derived from both lasers 102-104. At an output of the sensor 118, a beat frequency can be generated due to mixing of each reflected optical signal field with its corresponding local oscillator signal. While the wavelength of each local oscillator and associated signal can be different for the two lasers 102-104, a beat frequency due to the signal range and Doppler can be common and therefore can add. Moreover, noise due to speckle can be reduced due to diminished correlation generated by the wavelength differences. Accordingly, wavelength diversity can be utilized to reduce speckle noise in the lidar system 100 shown in FIG. 4 (e.g., an FMCW lidar system). The speckle noise is a noise source that can be associated with various types of lidar systems and can represent a significant contributor to overall noise of conventional lidar systems.

Figure 5:
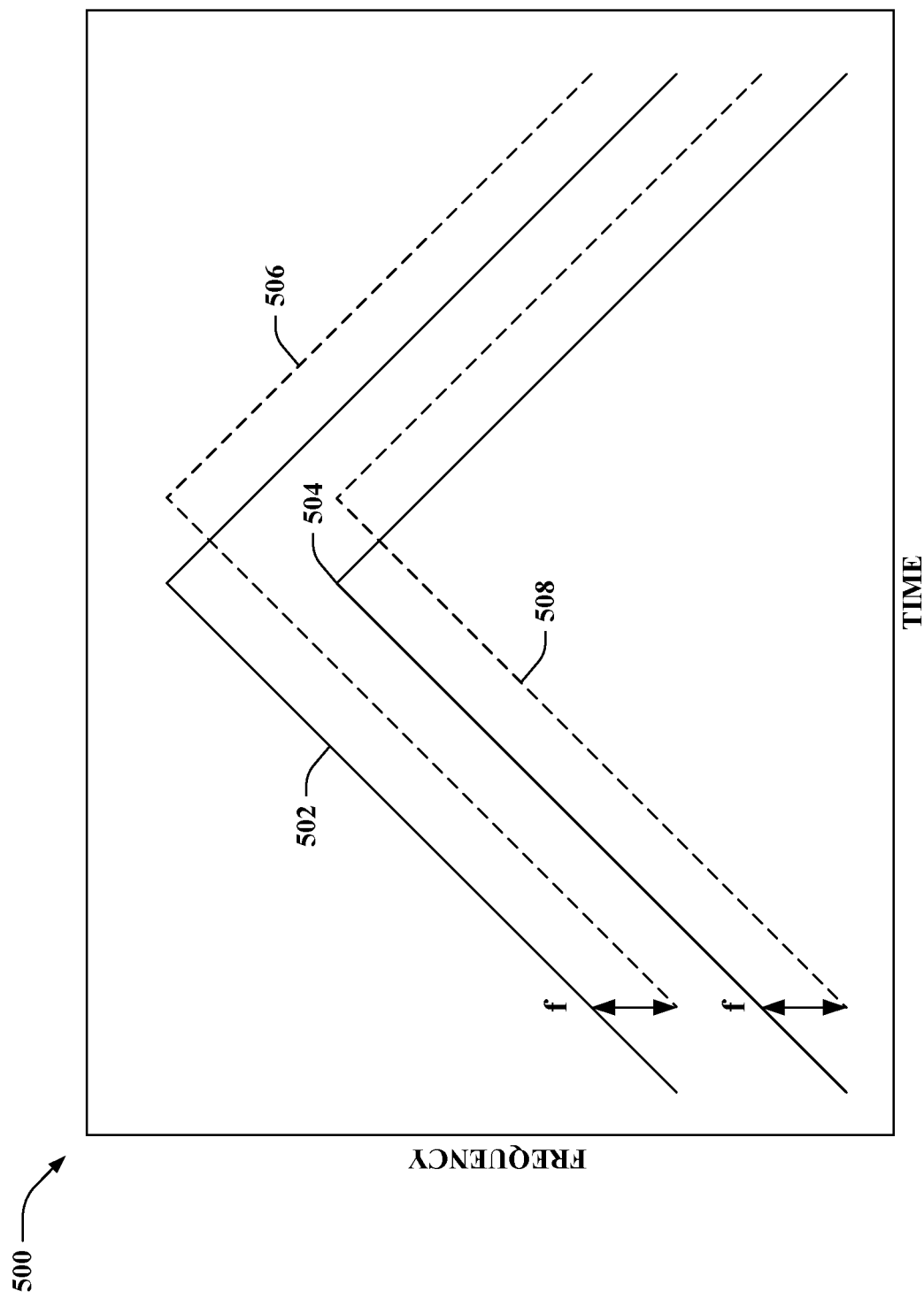
FIG. 5 illustrates a chart showing local oscillator signals derived from lasers of the lidar system as well as corresponding reflected optical signals.
Figure 6:
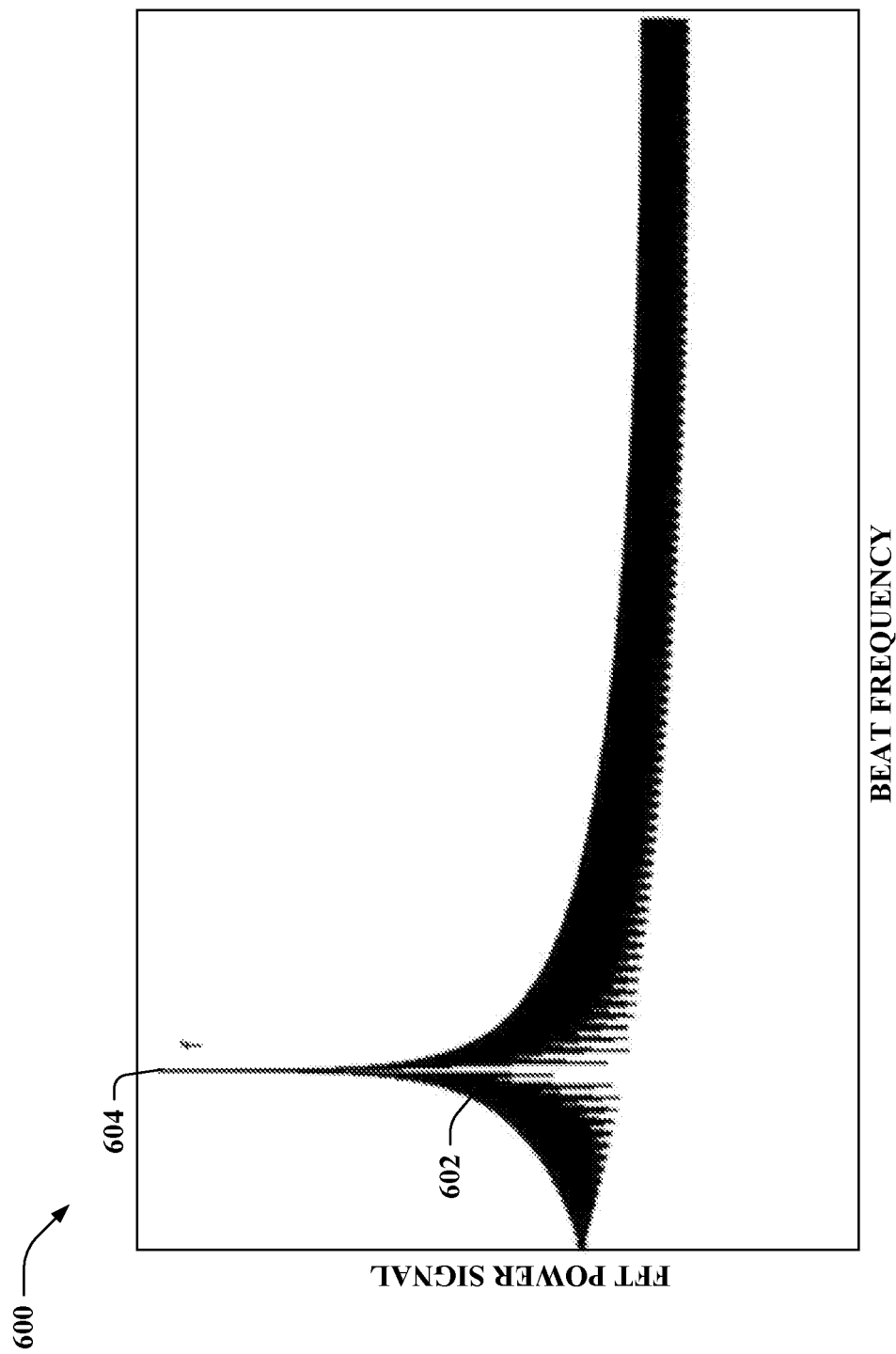
FIG. 6 illustrates a chart showing a frequency signal that corresponds to the local oscillator signals and the reflected optical signals as depicted in FIG. 5.

Referring to FIG. 5, illustrated is a chart 500 showing a local oscillator signal 502 derived from the first laser 102 and a local oscillator signal 504 derived from the second laser 104. The chart 500 further shows a reflected optical signal 506 and a reflected optical signal 508. The reflected optical signal 506 corresponds to a part of the first frequency modulated optical signal generated by the first laser 102 that reflected off an object in the environment, and the reflected optical signal 508 corresponds to a part of the second frequency modulated optical signal generated by the second laser 104 that reflected off the same object in the environment. In the sensor 118, the local oscillator signal 502 and the reflected optical signal 506 mix to output a beat frequency f, and the local oscillator signal 504 and the reflected optical signal 508 mix to output the same beat frequency f. The beat frequencies can add. According to an example, the sensor 118 can output an analog signal representative of the added beat frequencies, an ADC can convert the analog signal to a digital signal, and the processing circuitry 120 can perform a Fast Fourier Transform (FFT) on the digital signal to form a frequency signal. Referring briefly to FIG. 6, a chart 600 illustrating a frequency signal 602 that corresponds to the local oscillator signals 502 and 504 and the reflected optical signals 506 and 508 as depicted in FIG. 5 is presented. The beat frequency f is the peak 604 of the frequency signal 602 depicted in FIG. 6.

Reference is again made to FIG. 4. As described herein, the lidar system 100 can mitigate noise due to speckle, which is a fine scale, high contrast, granular pattern that appears when an optical signal from a laser is reflected from a surface with roughness on the same scale as the wavelength of the laser (or larger). The speckle pattern can also produce noisy intensity fluctuations that are detrimental to the SNR of lidar systems.

The distribution of the intensity fluctuations in a speckle pattern depends on a number of parameters (direction of the illumination and observation) including wavelength of incident light. The cross correlation of two speckle fields depends on the characteristic function of the surface height fluctuations, h, a function of intensity distribution across the scattering spot, and the scattering vector. The scattering vector can be defined as:

$$\vec{q} = \vec{k}_o - \vec{k}_1$$

In the foregoing, k is the wave-vector $$k = \frac{2\pi}{\lambda},$$

with λ being the wavelength of light.

The average wave-vector in the illuminating beam is $k_i$, where i represents the direction of illumination, and o is the direction of observation. In the case of two wavelengths illuminating a (rough) surface in the normal direction, and defining $\Delta \vec{q} = \vec{q}_1 - \vec{q}_2$ as the difference of the scattering vectors corresponding to the two wavelengths, $\lambda_1$ and $\lambda_2$, it follows that the transverse component of $\Delta \vec{q}$ is zero and the normal component is as follows:

$$\Delta q_z = 4\pi \left| \frac{1}{\lambda_1} - \frac{1}{\lambda_2} \right| \simeq 4\pi \frac{|\Delta \lambda|}{\bar{\lambda}^2}$$

In the foregoing, $\Delta \lambda = \lambda_1 - \lambda_2$ and $\bar{\lambda} = (\lambda_1 + \lambda_2)/2$.

Reduction of speckle intensity correlation to a value equal to or less than $1/e^2$ can occur in the following scenario:

$$|\Delta \lambda| \geq \frac{1}{2\sqrt{2\pi}} \frac{\bar{\lambda}^2}{\sigma_h}$$

$\sigma_h$ is the standard deviation of surface-height fluctuations.

Thus, the use of two wavelengths as described herein with the lasers 102-104 can reduce the unwanted contribution from speckle by decorrelating the speckle field. Assuming $\sigma_h > 10\lambda$, then this condition can be satisfied for two wavelengths separated by approximately 30 nm around 1550 nm light (e.g., 1530 nm and 1560 nm).

As described herein, the foregoing can be accomplished by the use of two separate lasers 102-104. Utilizing the lasers 102-104 in the lidar system 100 can result in two laser beams with different wavelengths; such laser beams can have common in propagation directions, receive directions, and bandwidths of the frequency chirps imposed on them. In contrast, some conventional systems may attempt to generate two laser beams utilizing two separate lidar systems (e.g., doubling the transmit systems and the receive systems). Moreover, it may be difficult to provide proper overlap for a receive system. For instance, if the chirp frequencies and bandwidths for the two laser beams are not identical, then the receive signal representing reflection from the same target may yield two sets of peaks in the Fourier spectrum of the beat signal between the received signals and the two local oscillator fields. The foregoing may complicate the receiver, since it may be needed to devise proper filtering to associate the right two signals with the same target.

As set forth herein, the optical resonator 106 includes an electrode (or electrodes) to which the modulator 108 applies the time-varying voltage, which in turn can change the index of refraction of the electrooptic material of the optical resonator 106. Changes to the index of refraction over time change the frequency of the mode to which the lasers 102-104 are optically injection locked. Thus, the frequency of the light outputted by the lasers 102-104 coupled to the optical resonator 106 also changes. Accordingly, a chirp can be implemented on the frequency of the lasers 102-104 without changing current, temperature, or voltage of the lasers 102-104.

Figure 7:
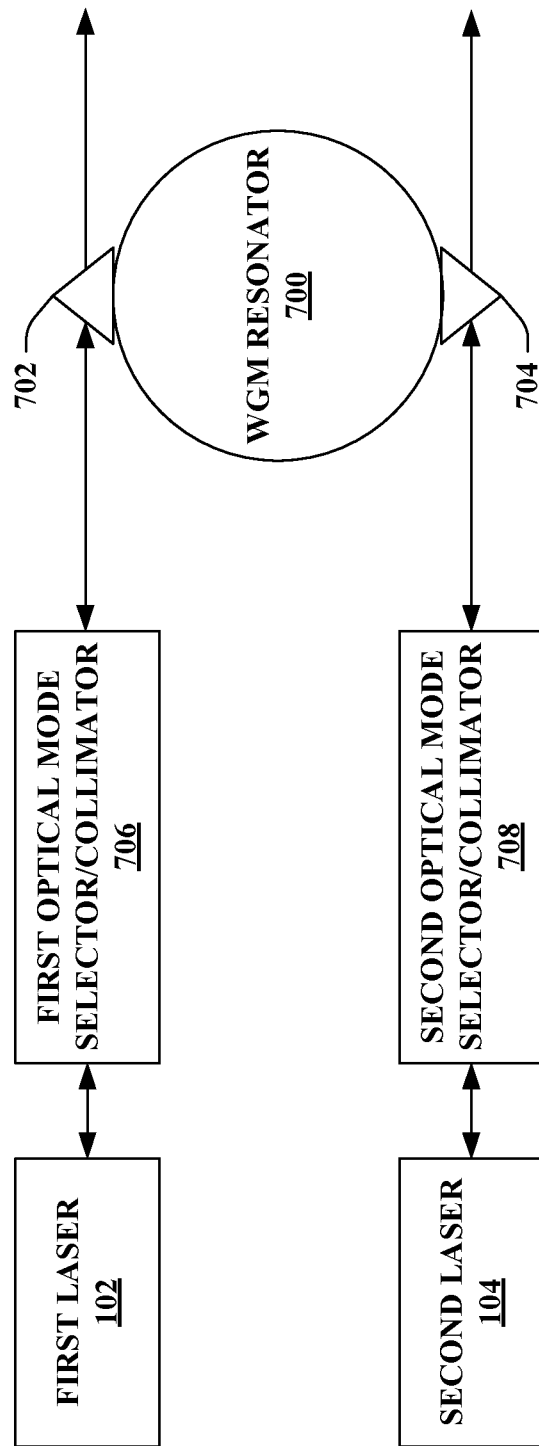
FIG. 7 illustrates a functional block diagram of a portion of a lidar system in accordance with various aspects.

With reference to FIG. 7, illustrated is an example of the lasers 102-104 optically coupled to an optical resonator (e.g., the optical resonator 106). It is to be appreciated that FIG. 7 is presented for illustration purposes, and other configurations are intended to fall within the scope of the hereto appended claims. In the example shown if FIG. 7, the lasers 102-104 are optically coupled to a WGM resonator 700. Moreover, in the example shown in FIG. 7, a beam from the first laser 102 is optically coupled into the WGM resonator 700 via an optical coupler 702. Moreover, a beam from the second laser 102 is optically coupled into the WGM resonator 700 via an optical coupler 704. According to an example, the optical couplers 702-704 can be prisms; however, other types of optical couplers 702-704 are intended to fall within the scope of the hereto appended claims (e.g., waveguides, etc.).

Moreover, it is contemplated that a collimator or optical mode selector may optionally be interposed between the lasers 102-104 and the WGM resonator 700 (e.g., a first optical mode selector/collimator 706 can be interposed between the first laser 102 and the WGM resonator 700 and a second optical mode selector/collimator 708 can be interposed between the second laser 102 and the WGM resonator 700).

Reference is again made to FIG. 4. Beams from the first laser 102 at the first wavelength and the second laser 104 at the second wavelength can be split into two parts (e.g., by the optical couplers 702-704). According to an example, approximately 90% of the light of the beams can be sent to the beam combiner 400 while a remainder (e.g., approximately 10%) of the light of the beams can be sent to each of the modes selected to have the same polarizations to provide self-injection locking of the lasers 102-104 to the mode of the optical resonator 106. Thus, common spectral purity (low noise) can be obtained for both lasers 102-104. Further, chirping of both lasers 102-104 can be accomplished by applying the time-varying voltage (e.g., by the modulator 108) to the optical resonator 106. Light output from the optical couplers 702-704, for instance, can be used in conjunction with a photodetector to monitor the process. Moreover, the approximately 90% of the light of each of the beams can be combined by the beam combiner 400. Further, the beam splitter 112 can split the combined beam, sending a portion for transmission from the lidar system 100 (e.g., via the front end optics 114 towards the object 116) and a local oscillator portion to the sensor 118.

The architecture shown in FIG. 4 allows reflected optical signals from each of the lasers 102-104 to be mixed with corresponding local oscillator portions of the optical signals generated by the lasers 102-104. For instance, signal due to $\lambda_1$, reflected from the object 116 at distance R, can mix with the corresponding local oscillator portion to produce a beat that will appear as a peak at frequency f on the Fourier spectrum. Signal due to $\lambda_2$ will also produce the same beat frequency f from the same object 116 at distance R, since the two frequency variations (such as chirps) on the two lasers 102-104 are identical, and the object 116 at distance R produced the same beat frequency independent of the wavelengths at which the lasers 102-104 operate, $\lambda_1$ and $\lambda_2$. It is noted that the amplitude of the two beat signals due to each of the lasers 102-104 add. For instance, if there is no degradation due to a noise source, the received signal can be the sum of the two beat signals obtained from simultaneously using the two lasers 102-104.

In the presence of speckle, the effect of the speckle field decorrelation can be to produce a signal strength that is the sum of the two signals from the lasers 102-104 at diverse wavelengths. The sum, for instance, can be larger than the corresponding signal if the lasers 102-104 both operate at a common wavelength.

As described herein, the two wavelengths for the first laser 102 and the second laser 104 used for speckle decorrelation can be a few tens of nm apart. Further, optical elements in the path out of the transmitter of the lidar system 100 and through the receiver of the lidar system 100 may be used by both of the lasers 102-104.

Figure 8:
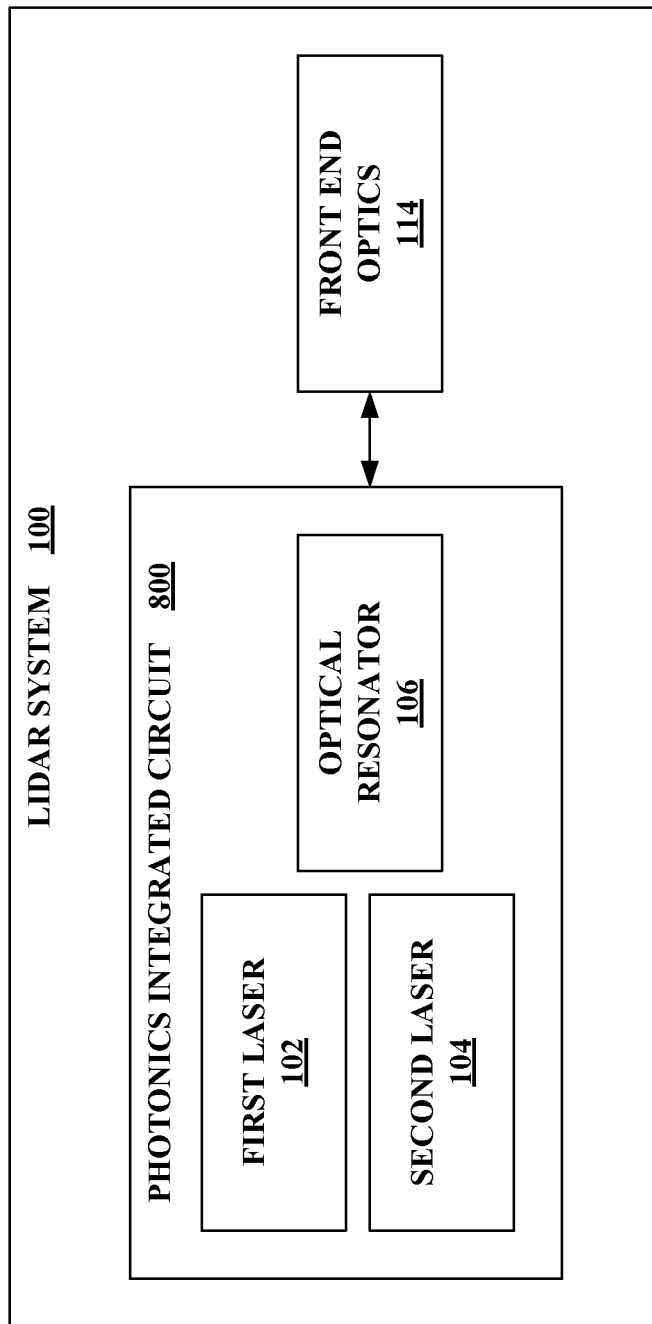
FIG. 8 illustrates a functional block diagram of another exemplary multiple laser, single optical resonator lidar system.

With reference to FIG. 8, illustrated is another exemplary embodiment of the lidar system 100. As depicted, the lidar system 100 can include a photonics integrated circuit 800. The photonics integrated circuit 800 can be optically coupled to the front end optics 114. The photonics integrated circuit 800 can include various elements described herein as being included in the lidar system 800. For instance, as shown, the first laser 102, the second laser 104, and the optical resonator 106 can be integrated as part of the photonics integrated circuit 800. Moreover, it is to be appreciated that other elements described herein can similarly be integrated as part of the photonics integrated circuit 800. Accordingly, the lidar system 100 can be implemented on the photonics integrated circuit 800 at chip scale. Further, the photonics integrated circuit 800 can be formed of a material such as, for example, silicon, silicon nitride, or the like (e.g., which can support wavelength separations described herein).

Figure 9:
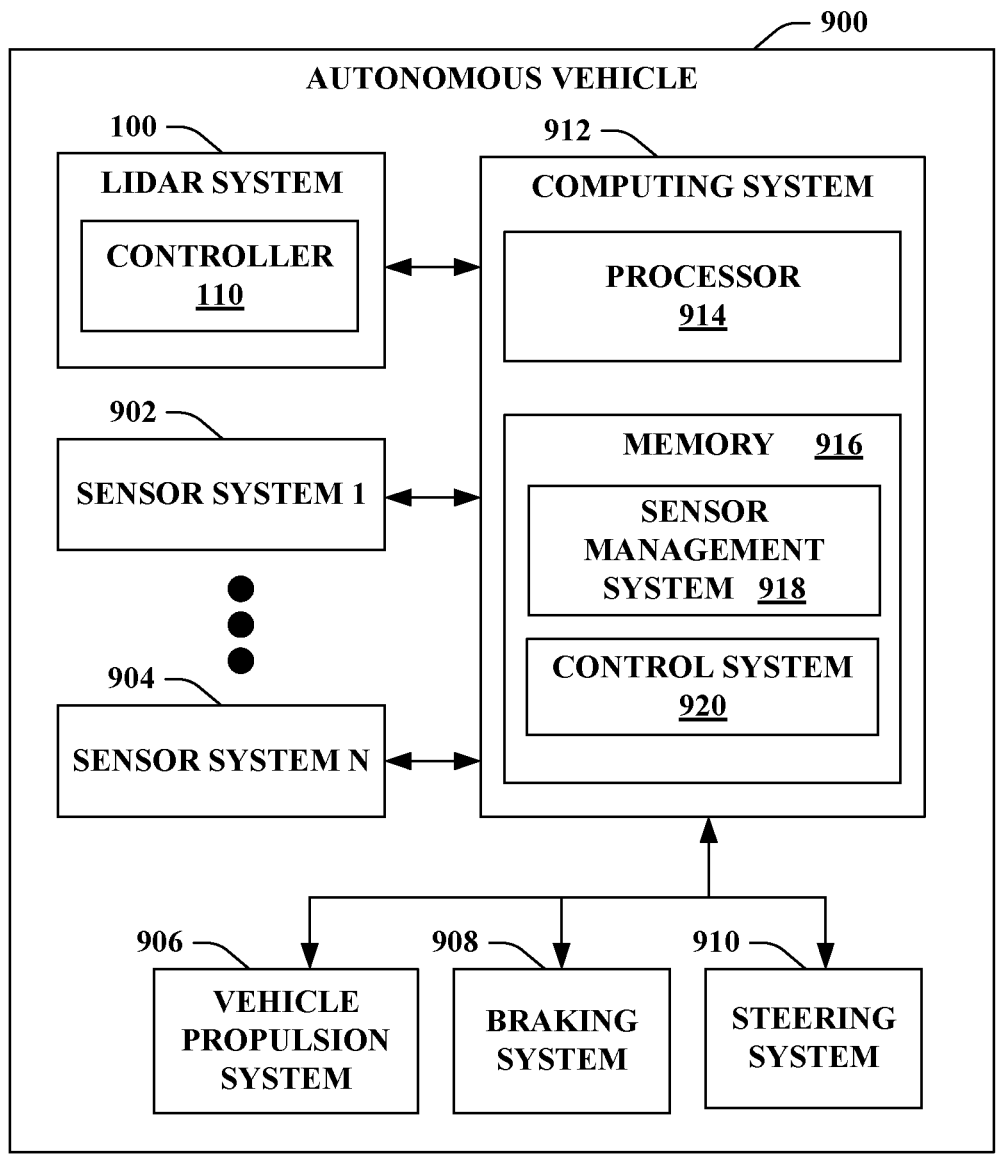
FIG. 9 illustrates a functional block diagram of an exemplary autonomous vehicle.

With reference to FIG. 9, illustrated is an exemplary autonomous vehicle 900. The autonomous vehicle 900 can navigate about roadways without a human driver based on sensor signals outputted by sensor systems of the autonomous vehicle 900. The autonomous vehicle 900 includes the lidar system 100 as well as one or more other sensor systems, namely, a sensor system 1 902, . . . , and a sensor system N 904, where N can be substantially any integer greater than 1. The sensor system 1 902, . . . , and the sensor system N 904 are collectively referred to herein as sensor systems 902-904. The sensor systems 902-904 are of different types and are arranged about the autonomous vehicle 900. For example, the sensor system 1 902 may be a radar sensor system and the sensor system N 904 may be a camera sensor system. Other exemplary sensor systems included in the sensor systems 902-904 can include GPS sensor systems, sonar sensor systems, infrared sensor systems, and the like.

The autonomous vehicle 900 further includes several mechanical systems that are used to effectuate appropriate motion of the autonomous vehicle 900. For instance, the mechanical systems can include, but are not limited to, and a vehicle propulsion system 906, a braking system 908, and a steering system 910. The vehicle propulsion system 906 can include an electric engine, an internal combustion engine, or a combination thereof. The braking system 908 can include an engine brake, brake pads, actuators, and/or any other suitable componentry that is configured to assist in decelerating the autonomous vehicle 900. The steering system 910 includes suitable componentry that is configured to control the direction of movement of the autonomous vehicle 900.

The autonomous vehicle 900 additionally includes a computing system 912 that is in communication with the lidar sensor 100, the sensor system 902-904, the vehicle propulsion system 906, the braking system 908, and the steering system 910. The computing system 912 includes a processor 914 and memory 916; the memory 916 includes computer-executable instructions are executed by the processor 914. Pursuant to various examples, the processor 914 can be or include a graphics processing unit (GPU), a plurality of GPUs, a central processing unit (CPU), a plurality of CPUs, and application-specific integrated circuit (ASIC), a microcontroller, a programmable logic controller (PLC), a field programmable gate array (FPGA), or the like.

The memory 916 of the computing system 912 includes a sensor management system 918 that can control the lidar system 100 as well as the other sensor systems 902-904. The sensor management system 918 can receive the distance and velocity data 122 generated by the lidar system 100. Moreover, according to various examples, the sensor management system 918 can control the lidar system 100 to selectively enable or disable the lasers 102-104. According to an example, the sensor management system 918 can transmit weather data (e.g., the weather data 304) or vehicle operation data (e.g., the vehicle operation data 306) to the lidar system 100 (e.g., the controller 110). By way of another example, the sensor management system 918 can transmit data indicative of the desired detection range of the lidar system 100 to the lidar system 100. By way another example, the sensor management system 918 can determine which wavelength to employ, and can send a control signal to the lidar system 100 to cause the appropriate enabling and disabling of the lasers 102-104. However, it is to be appreciated that the claimed subject matter is not limited to the lidar system 100 included in the autonomous vehicle 900 selectively enabling the lasers 102-104 (e.g., the lidar system 100 can concurrently operate the lasers 102-104 as described above).

The memory 916 can further include a control system 920. The control system 920 is configured to control at least one of the mechanical systems of the autonomous vehicle 900 (e.g., at least one of the vehicle propulsion system 906, the braking system 908, and/or the steering system 910). For instance, the control system 920 can control the vehicle propulsion system 906, the braking system 908, and/or the steering system 910 based on a motion plan for the autonomous vehicle 900 generated based at least in part on the distance and velocity data 122 generated by the lidar system 100.

Figure 10:
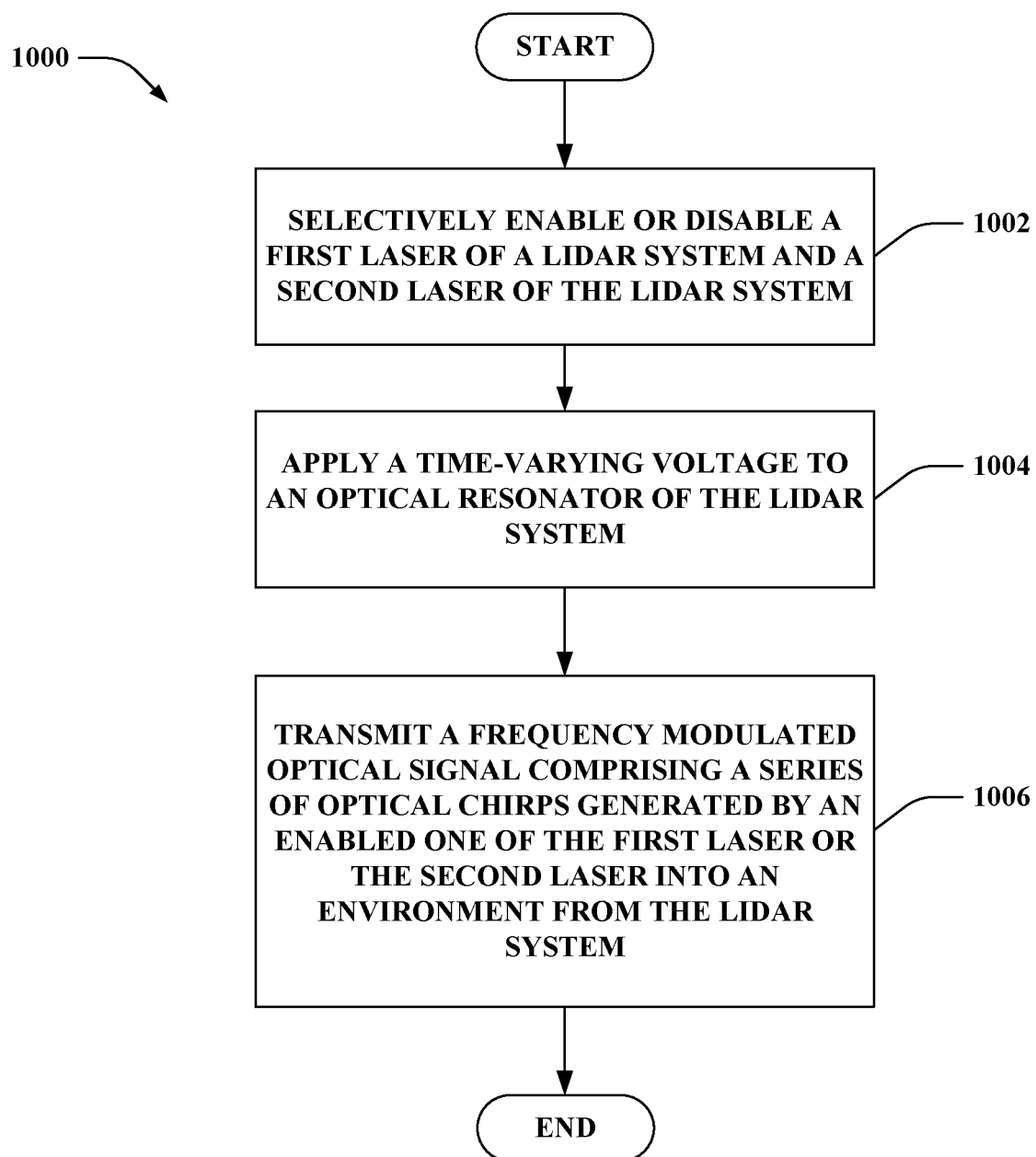
FIG. 10 is a flow diagram that illustrates an exemplary methodology of operating a lidar system.
Figure 11:
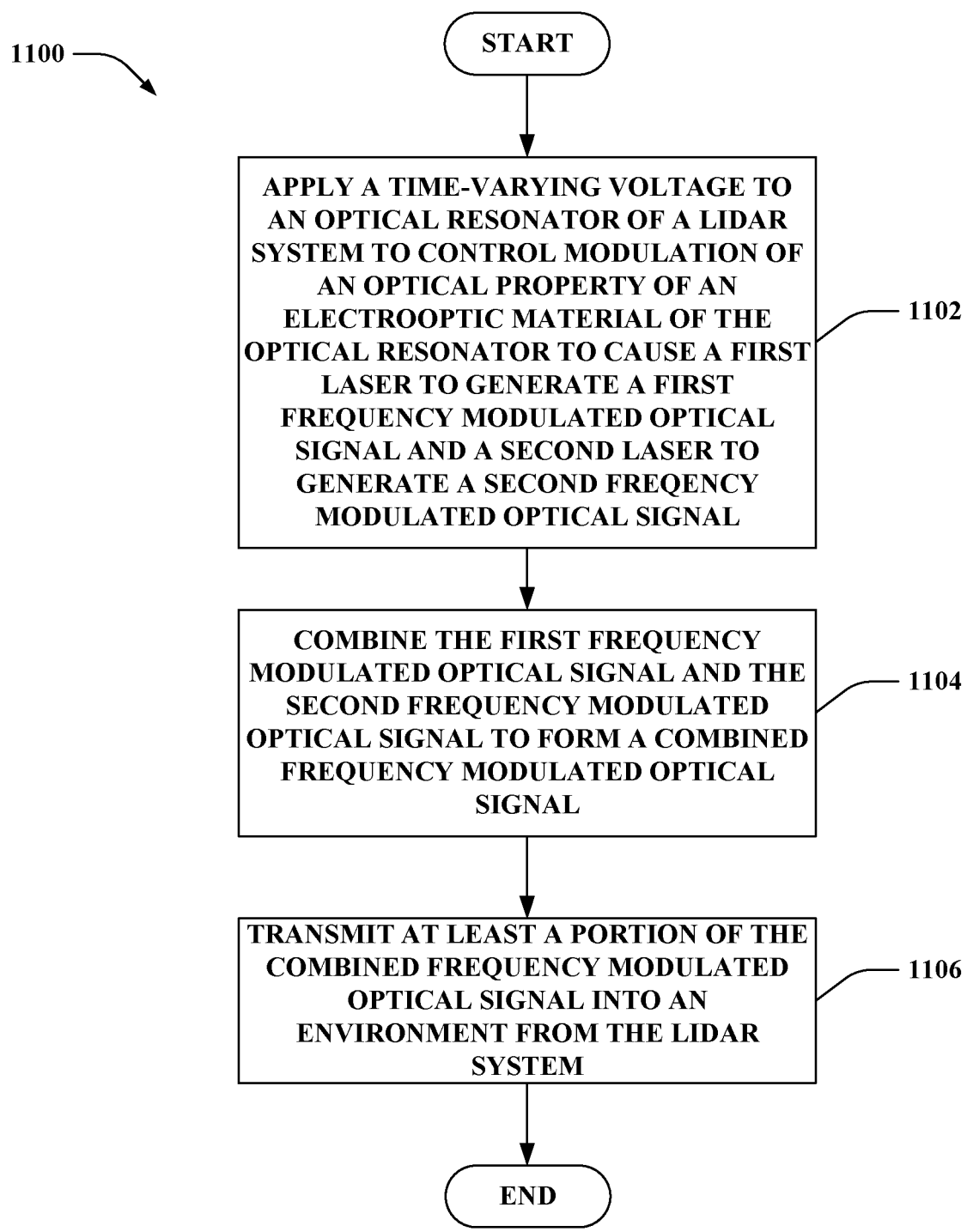
FIG. 11 is a flow diagram that illustrates another exemplary methodology of operating a lidar system.

FIGS. 10-11 illustrate exemplary methodologies relating to operating a multiple laser, single optical resonator lidar system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 10 illustrates a methodology 1000 of operating a lidar system. At 1002, a first laser of the lidar system and a second laser of the lidar system can be selectively enabled or disabled. The first laser can be configured to operate at a first wavelength and the second laser can be configured to operate at a differing, second wavelength. At 1004, a time-varying voltage can be applied to an optical resonator of the lidar system. The optical resonator can be optically coupled to both the first laser and the second laser. The optical resonator can be formed of an electrooptic material. The first laser and the second laser are optically injection locked to the optical resonator. Moreover, the time-varying voltage can control modulation of an optical property of the electrooptic material. At 1006, a frequency modulated optical signal comprising a series of optical chirps generated by an enabled one of the first laser or the second laser can be transmitted into an environment from the lidar system. Modulation of the optical property of the electrooptic material of the optical resonator can cause the enabled one of the first laser or the second laser to generate the frequency modulated optical signal. According to various examples, the first laser and the second laser can be selectively enabled or disabled based on a moisture level in the environment. By way of another example, the first laser and the second laser can be selectively enabled or disabled based on a desired detection range of the lidar system.

Turning to FIG. 11, illustrated is another methodology 1100 of operating a lidar system. At 1102, a time-varying voltage can be applied to an optical resonator of the lidar system. The optical resonator can be optically coupled to both a first laser of the lidar system and a second laser of the lidar system. The first laser can be configured to operate at a first wavelength and the second laser can be configured to operate at a differing, second wavelength. The optical resonator can be formed of an electrooptic material. Moreover, the first laser and the second laser are optically injection locked to the optical resonator. The time-varying voltage controls modulation of an optical property of the electrooptic material to cause the first laser to generate a first frequency modulated optical signal comprising a first series of optical chirps and the second laser to generate a second frequency modulated optical signal comprising a second series of optical chirps. At 1104, the first frequency modulated optical signal and the second frequency modulated optical signal can be combined to form a combined frequency modulated optical signal. At 1106, at least a portion of the combined frequency modulated optical signal can be transmitted into an environment from the lidar system.

Figure 12:
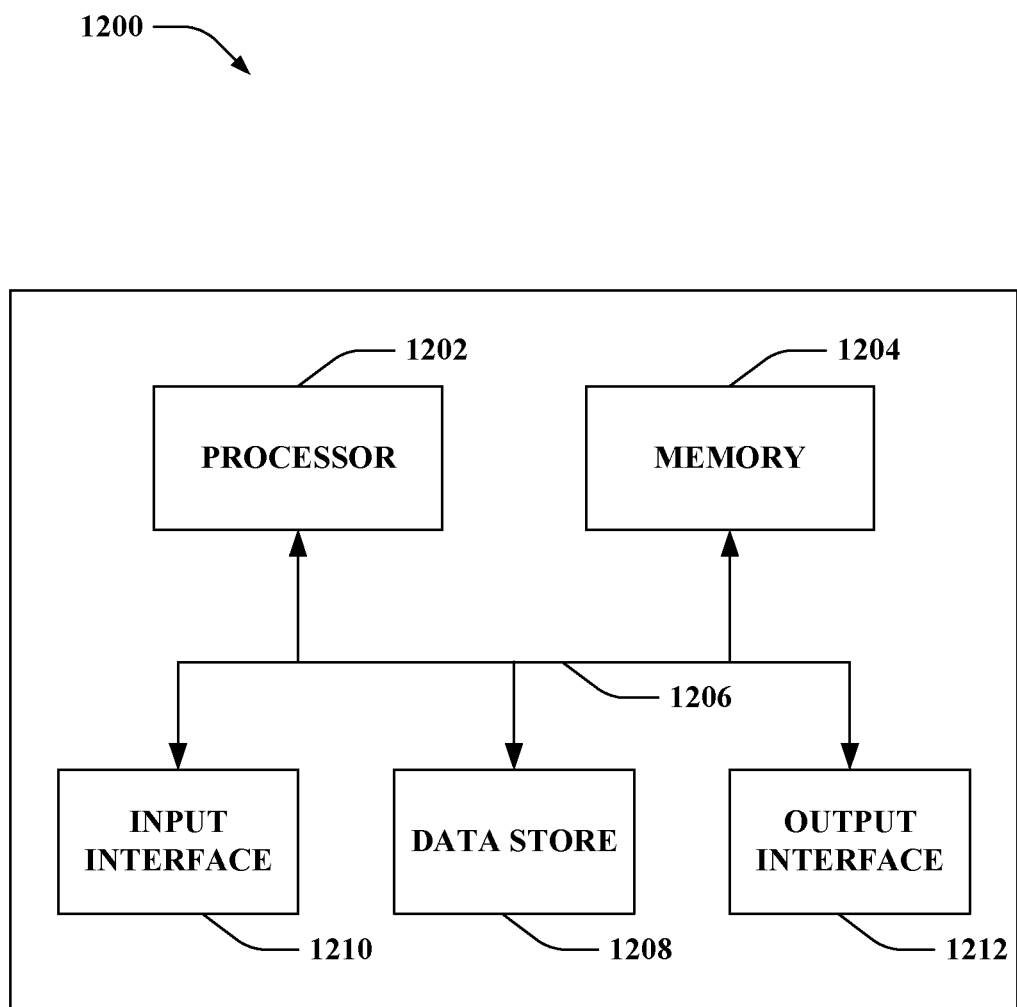
FIG. 12 illustrates an exemplary computing device.

Referring now to FIG. 12, a high-level illustration of an exemplary computing device 1200 that can be used in accordance with the systems and methodologies disclosed herein is illustrated. For instance, the computing device 1200 may be or include the computing system 912. The computing device 1200 includes at least one processor 1202 that executes instructions that are stored in a memory 1204. The instructions may be, for instance, instructions for implementing functionality described as being carried out by one or more systems discussed above or instructions for implementing one or more of the methods described above. The processor 1202 may be a GPU, a plurality of GPUs, a CPU, a plurality of CPUs, a multi-core processor, etc. The processor 1202 may access the memory 1204 by way of a system bus 1206. In addition to storing executable instructions, the memory 1204 may also store distance and velocity data, weather data, vehicle operation data, and so forth.

The computing device 1200 additionally includes a data store 1208 that is accessible by the processor 1202 by way of the system bus 1206. The data store 1208 may include executable instructions, distance and velocity data, weather data, vehicle operation data, etc. The computing device 1200 also includes an input interface 1210 that allows external devices to communicate with the computing device 1200. For instance, the input interface 1210 may be used to receive instructions from an external computer device, etc. The computing device 1200 also includes an output interface 1212 that interfaces the computing device 1200 with one or more external devices. For example, the computing device 1200 may transmit control signals to the engine 906, the braking system 908, and/or the steering system 910 by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A lidar system, comprising:
a first laser configured to operate at a first wavelength;

a second laser configured to operate at a second wavelength, wherein the second wavelength differs from the first wavelength;
an optical resonator that is optically coupled to both the first laser and the second laser, the optical resonator being formed of an electrooptic material, wherein the first laser and the second laser are optically injection locked to the optical resonator;
a single modulator configured to apply a time-varying voltage to the optical resonator, the time-varying voltage controls modulation of an optical property of the electrooptic material to cause the first laser to generate a first frequency modulated optical signal comprising a first series of optical chirps and the second laser to generate a second frequency modulated optical signal comprising a second series of optical chirps;
a beam combiner configured to combine the first frequency modulated optical signal and the second frequency modulated optical signal to form a combined frequency modulated optical signal; and
front end optics configured to transmit at least a portion of the combined frequency modulated optical signal into an environment from the lidar system.

2. The lidar system of claim 1, the first wavelength and the second wavelength being separated by more than 20 nm and less than 40 nm.

3. The lidar system of claim 1, the first wavelength and the second wavelength being separate by more than 25 nm and less than 35 nm.

4. The lidar system of claim 1, the first wavelength being 1530 nm and the second wavelength being 1560 nm.

5. The lidar system of claim 1, further comprising:
a beam splitter configured to split the combined frequency modulated optical signal into the portion of the combined frequency modulated optical signal to be transmitted into the environment and a local oscillator portion of the combined frequency modulated optical signal.

6. The lidar system of claim 5, wherein:
the front end optics further configured to receive a reflected optical signal, the reflected optical signal corresponds to at least a part of the portion of the combined frequency modulated optical signal that reflected off an object in the environment;
the lidar system further comprises:
a sensor configured to mix the reflected optical signal with the local oscillator portion of the combined frequency modulated optical signal; and
processing circuitry that is configured to compute distance and velocity data of the object based on the reflected optical signal mixed with the local oscillator portion of the combined frequency modulated optical signal.

7. The lidar system of claim 1, further comprising:
a photonics integrated circuit, wherein at least the first laser, the second laser, and the optical resonator are integrated on the photonics integrated circuit.

8. The lidar system of claim 1, the optical resonator is a whispering gallery mode (WGM) resonator.

9. The lidar system of claim 1, the optical property of the electrooptic material comprises an index of refraction.

10. A lidar system, comprising:
a photonics integrated circuit, comprising:
a first laser configured to operate at a first wavelength;
a second laser configured to operate at a second wavelength, wherein the second wavelength differs from the first wavelength;
an optical resonator that is optically coupled to both the first laser and the second laser, the optical resonator being formed of an electrooptic material, wherein the first laser and the second laser are optically injection locked to the optical resonator;
a single modulator configured to apply a time-varying voltage to the optical resonator, the time-varying voltage controls modulation of an optical property of the electrooptic material to cause the first laser to generate a first frequency modulated optical signal comprising a first series of optical chirps and the second laser to generate a second frequency modulated optical signal comprising a second series of optical chirps; and
a beam combiner configured to combine the first frequency modulated optical signal and the second frequency modulated optical signal to form a combined frequency modulated optical signal; and
front end optics optically coupled to the photonics integrated circuit, the front end optics configured to transmit at least a portion of the combined frequency modulated optical signal into an environment from the lidar system.

11. The lidar system of claim 10, the photonics integrated circuit further comprises:
a beam splitter configured to split the combined frequency modulated optical signal into the portion of the combined frequency modulated optical signal to be transmitted into the environment and a local oscillator portion of the combined frequency modulated optical signal.

12. The lidar system of claim 11, wherein:
the front end optics are further configured to receive a reflected optical signal, the reflected optical signal corresponds to at least a part of the portion of the combined frequency modulated optical signal that reflected off an object in the environment;
the photonics integrated circuit further comprises:
a sensor configured to mix the reflected optical signal with the local oscillator portion of the combined frequency modulated optical signal.

13. The lidar system of claim 12, the photonics integrated circuit further comprises:
processing circuitry that is configured to compute distance and velocity data of the object based on the reflected optical signal mixed with the local oscillator portion of the combined frequency modulated optical signal.

14. The lidar system of claim 10, the first wavelength and the second wavelength being separated by more than 20 nm and less than 40 nm.

15. The lidar system of claim 10, the first wavelength and the second wavelength being separate by more than 25 nm and less than 35 nm.

16. The lidar system of claim 10, the first wavelength being 1530 nm and the second wavelength being 1560 nm.

17. A method of operating a lidar system, comprising:
applying a time-varying voltage to an optical resonator of the lidar system, the time-varying voltage being applied to the optical resonator by a single modulator of the lidar system, the optical resonator being optically coupled to both a first laser of the lidar system and a second laser of the lidar system, the first laser is configured to operate at a first wavelength and the second laser is configured to operate at a differing, second wavelength, the optical resonator being formed of an electrooptic material, the first laser and the second laser are optically injection locked to the optical resonator, the time-varying voltage controls modulation of an optical property of the electrooptic material to cause the first laser to generate a first frequency modulated optical signal comprising a first series of optical chirps and the second laser to generate a second frequency modulated optical signal comprising a second series of optical chirps;

combining the first frequency modulated optical signal and the second frequency modulated optical signal to form a combined frequency modulated optical signal; and transmitting at least a portion of the combined frequency modulated optical signal into an environment from the lidar system.

18. The method of claim 17, further comprising:
splitting the combined frequency modulated optical signal into the portion of the combined frequency modulated optical signal to be transmitted into the environment and a local oscillator portion of the combined frequency modulated optical signal.

19. The method of claim 18, further comprising:
receiving a reflected optical signal, the reflected optical signal corresponds to at least a part of the portion of the combined frequency modulated optical signal that reflected off an object in the environment;

mixing the reflected optical signal with the local oscillator portion of the combined frequency modulated optical signal; and determining distance and velocity data of the object based on the reflected optical signal mixed with the local oscillator portion of the combined frequency modulated optical signal.

20. The method of claim 17, the first wavelength and the second wavelength being separated by more than 20 nm and less than 40 nm.

* * * * *